Sept. 25, 1962 J. O. MELTON ETAL 3,055,688
PIVOTED MEMBER BEARING AND ASSEMBLY
Filed June 21, 1960 2 Sheets-Sheet 2

INVENTORS
JAMES O. MELTON
THOMAS B. WILKINSON
BY
Jerry J. Dunlap
ATTORNEY

United States Patent Office 3,055,688
Patented Sept. 25, 1962

3,055,688
PIVOTED MEMBER BEARING AND ASSEMBLY
James O. Melton, Norman, and Thomas B. Wilkinson, Oklahoma City, Okla., assignors to Jamco, Inc., Oklahoma City, Okla., a corporation of Oklahoma
Filed June 21, 1960, Ser. No. 37,788
7 Claims. (Cl. 287—93)

This invention relates to pivotal bearings, and more particularly, but not by way of limitation, to idler arm assemblies as used in vehicular steering mechanisms.

In present automobile manufacture, a rod termed a "cross rod" or "drag link" is usually connected between the steering column located adjacent the left front wheel of the automobile and the right front wheel thereof. The drag link functions to transmit the turning motion of the left wheel to the right wheel. The mechanical reliability of the steering gear, as well as the steering performance, is improved by the use of a support means which is secured to the frame of the automobile and which supports the right extremity of the drag link. This support means generally consists of a bracket rigidly secured to the frame and depending downwardly therefrom, and an arm, termed an "idler arm," which is pivotally connected at one of its ends to a spindle portion of the bracket and is connected at its other end to the drag link.

The design and construction of the idler arm pivotal connection is extremely important in providing safety in the operation of the automobile and in reducing the effort required to steer to a minimum. The bearing surfaces in the pivotal connection must be hard enough to resist the considerable wear which is imposed thereupon over extended periods of operation and must have a sufficiently low coefficient of friction that the idler arm may be pivoted relative to the bracket with a minimum of effort. Moreover, the idler arm connection must be mechanically rugged enough to withstand sudden shock forces of considerable magnitude as well as constantly acting vibrational forces. The pivotal connection must be constructed to provide a minimum of play between the idler arm and the bracket in order that shimmying and a consequent reduction of safety will not occur.

In an existing idler arm assembly utilized in present automobile manufacture, ball or roller bearings are provided in the pivotal connection described above. During initial operation of the automobile, this type of bearing surface works quite well and permits steering to be accomplished with relatively little effort. However, idler arm assemblies having these types of bearings become defective or decrease in efficiency relatively rapidly over extended periods of automobile operation. This is due in part to the fact that the idler arm assembly is located in a position which is constantly exposed to dust, mud, and water. These substances infiltrate the pivotal connection and abrade, rust, or corrode the metal bearing surfaces. The burring of such surfaces soon results in disintegration of the ball or roller bearings and consequent malfunctioning of the idler arm assembly.

Metal bearings, moreover, require frequent lubrication. If the bearing is not lubricated, through error or oversight, the usefulness of the bearing can be completely destroyed in a relatively short time.

The low coefficient of friction or so-called "self-lubricating property" of a number of high density synthetic resin materials is now a matter of common knowledge and in recent years has led to their utilization in a number of applications where the reduction of friction between contacting components is highly desirable. Such materials as polyethylene, polymerized tetrafluoroethylene, and long chain synthetic polymeric amides have all been utilized in a number of devices as bearing surfaces affording decreased frictional resistance to the relative movement of contacting parts.

In our co-pending U.S. application for Letters Patent, Serial No. 842,016, filed September 24, 1959, now Patent No. 3,010,733 we have described a novel idler arm assembly which features an idler arm pivotally connected to the spindle portion of a bracket by means of bearing members of high density synthetic polymeric material. The arrangement of these bearing members, as described in said co-pending application, is such that a free-turning pivotal connection is formed which is rugged and durable and which does not require lubrication. Moreover, the bearing surfaces, being composed of high density synthetic resinous material, are not subject to rusting or erosion upon exposure to water, dust, mud, etc.

The present invention contemplates an improvement in pivotal bearings of the type disclosed in our co-pending application to which we refer above. This invention differs from that disclosed in said co-pending application and constitutes an improvement thereover in a number of respects. The desirable feature of providing contacting bearing surfaces of dissimilar polymeric materials in order to reduce frictional resistance to pivotal movement has been retained. Additionally, the idler arm assembly of the present invention provides a more compact pivotal bearing assembly which is constructed so as to allow less play or looseness to develop in the pivotal connection over extended periods of use of the vehicle upon which it is mounted.

The idler arm assembly of this invention further contemplates a pivotal bearing in which the spindle of the bracket previously mentioned is positioned inside a composite sleeve, the inner surface of which is metallic and the outer surface of which is a high density polymeric material. This feature materially assists in avoiding the distortion or bending of the sleeve which tends to occur when a sleeve of plastic material alone is employed. In the latter instance, a sudden jolt or shock imparted to the wheel adjacent the idler arm may cause a rough spot to develop on the inner periphery of the plastic sleeve, and it may, as a result thereof, be bent or distorted from a true cylindrical configuration. With the inner portion of the composite sleeve constructed of a relatively thick layer of steel or other suitable metal, this undesirable feature is avoided.

The advantages of providing pivotal contact between dissimilar resinous materials are retained in the present invention by surrounding the composite sleeve with bearing sleeves constructed from a resinous material which has dissimilar frictional properties than those which characterize the plastic forming the outer layer of the composite sleeve. These bearing sleeves are pressed into the bore of the idler arm which pivotally journals the spindle of the bracket. In this manner, pivotal bearing contact between dissimilar resinous materials is afforded and structural ruggedness and operating life are simultaneously improved.

The bearing assembly of this invention is further characterized by the existence of minimum clearances between all parts which move relatively to each other. Moreover, a pair of cup-shaped washers snugly encloses the bearing elements and thereby prevents the ingress of deleterious materials to the interior of the bearing. This construction permits the composite sleeve to be utilized without fear of water and dirt infiltrating between the inner layer of metal and the metal spindle of the bracket.

It is therefore a major object of this invention to provide an idler arm assembly which is mechanically sturdy and which affords a minimum of frictional resistance to the pivotation of the idler arm.

A further object of the invention is to provide a pivotal bearing which affords maximum assurance against the ingress of dirt, water and other deleterious substances to the bearing surfaces.

Another object of this invention is to provide an idler arm assembly which is able to withstand sudden shocks and constant vibrational stress over extended periods of use under adverse conditions.

An additional object of this invention is to provide an idler arm bearing which will retain accurate alignment of the automobile steering mechanism over a longer operating period.

A still further object of this invention is to provide an idler arm bearing which is compact, relatively inexpensive to manufacture, and which can be easily and quickly installed on an automobile.

Other objects and advantages will be evident from the following detailed description, when read in conjunction with the accompanying drawings which illustrate our invention.

Figure 1:
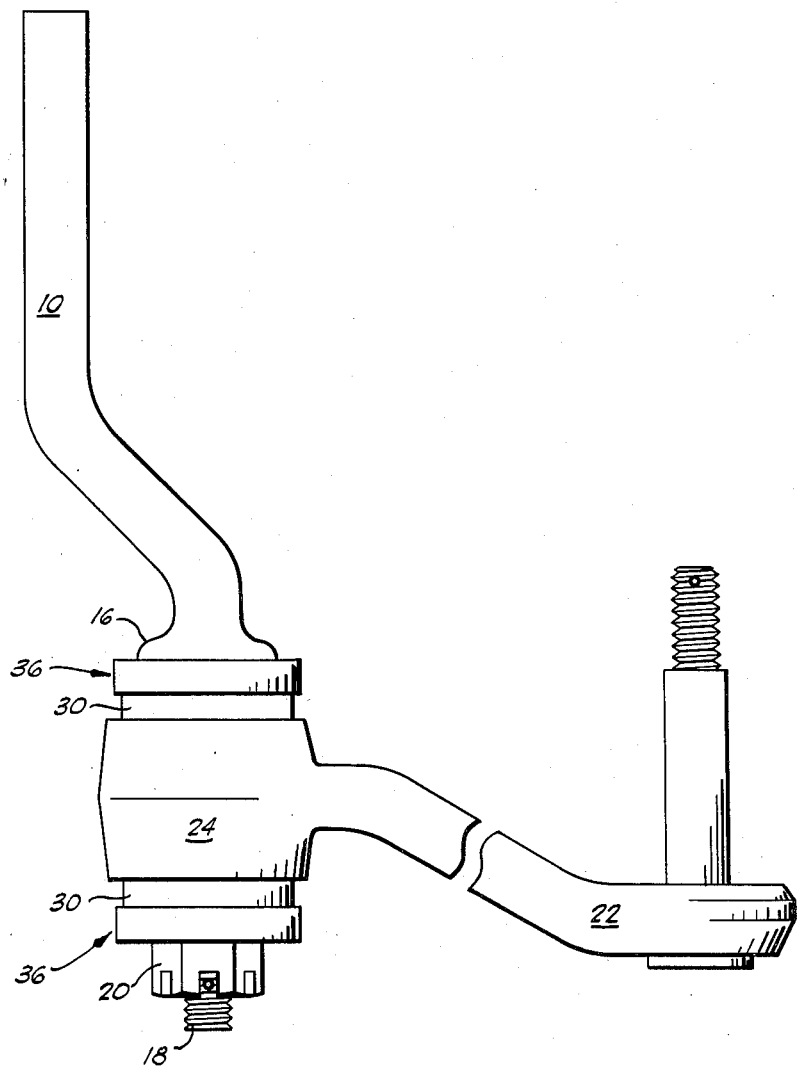
FIGURE 1 is a side elevation of a supporting bracket, idler arm, and bearing assembly according to this invention.
Figures 2, 3:
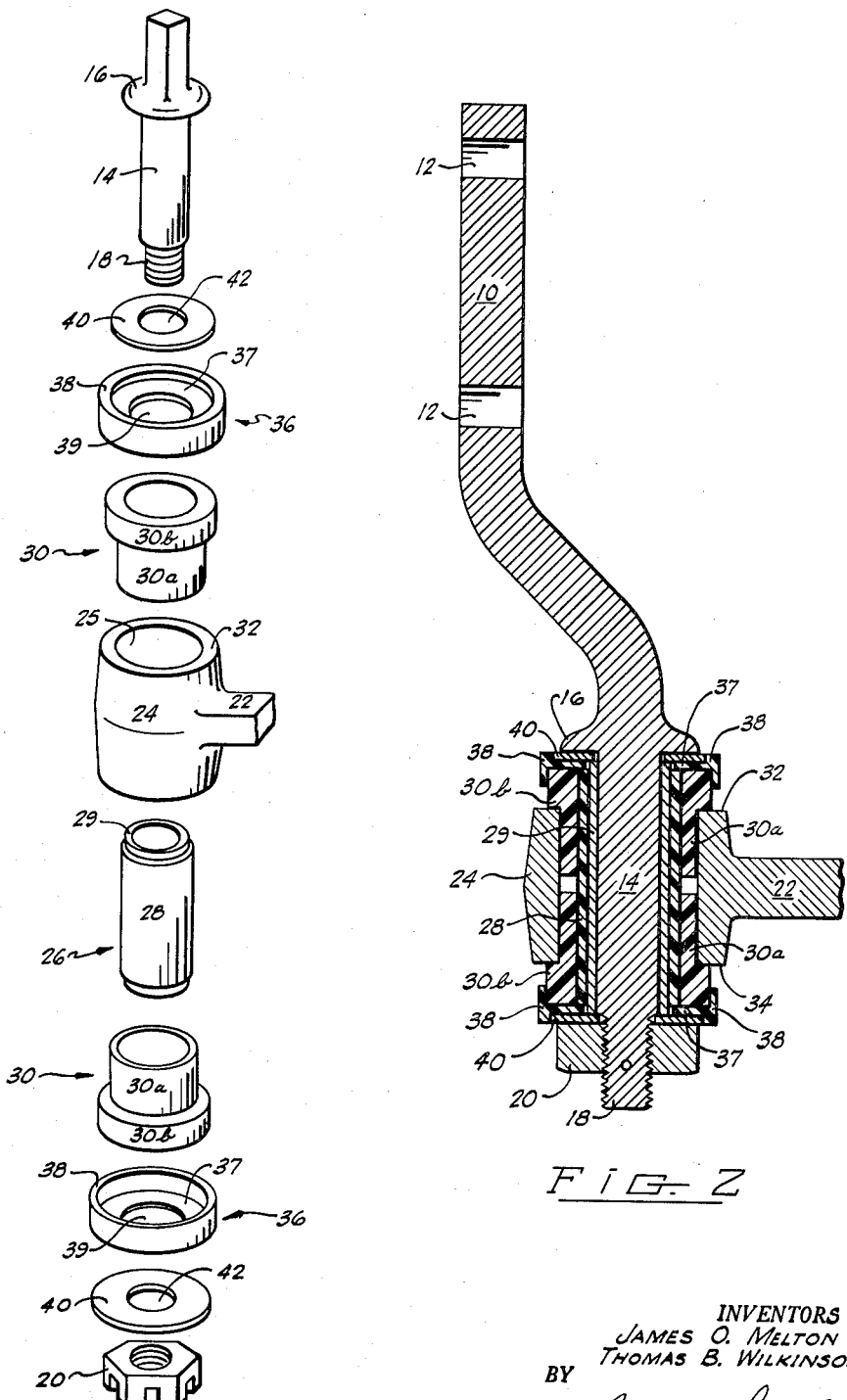
FIGURE 2 is a vertical sectional view of a portion of the structure illustrated in FIG. 1.
FIGURE 3 is an exploded view showing the several elements of the idler arm assembly detached from each other and in the relationship in which they are shown in FIG. 2.

Referring to the drawings in detail, and particularly to FIGS. 1 and 2, reference character 10 designates a bracket having suitable bolt holes 12 therein for the purpose of securing the bracket to the frame of a vehicle (not shown). The bracket 10 is provided at its lower end with a smooth-surfaced spindle portion 14 which is limited at its upper end by a circumferential flange 16. The lower end 18 of the spindle 16 is threaded to receive a nut 20 for the purpose of maintaining the various elements of the bearing assembly in their operating position.

An idler arm 22 having a tubular hub portion 24 defining a bore 25 is pivotally supported on the spindle 14 by the novel bearing assembly of the present invention. The bearing assembly includes a tubular composite sleeve 26 which is comprised of an outer sleeve 28 of a high density synthetic resin and an inner sleeve 29 constructed of an appropriate metal, such as steel. The inner sleeve 29 is longer than the outer sleeve 28 and is press-fitted therein so as to protrude slightly from each end of the resin outer sleeve 28. The bore of the composite sleeve 26 is of a size to slidingly receive the spindle 14 therethrough.

The bearing assembly further includes upper and lower bearing sleeves 30 which are formed from a high density synthetic resin material. The bore through each of the bearing sleeves 30 has a diameter of sufficient size to slidingly receive the composite sleeve 26 therein without binding. Each of the bearing sleeves 30 is characterized by a shank portion 30a and a peripheral annular flange portion 30b. The diameter of the shank portion 30a of each of the bearing sleeves 30 is such that a relatively tight fit is achieved when the shank portions are inserted in the bore 25 of the idler arm hub portion 24. The tight fit of the shank portions 30a of the bearing sleeves 30 in the bore 25 of the idler arm hub portion 24 promotes rotation of the bearing sleeves 30 with the idler arm 22 during the pivotal movement of the latter.

The circumferential flange portion 30b of each of the bearing sleeves 30 is of a sufficiently large diameter to provide a shoulder which prevents the bearing sleeves 30 from being pressed into the bore 25 of the hub 24 further than a predetermined amount. The circumferential flange portions 30b of the upper and lower bearing sleeves 30 thus contact the upper and lower surfaces 32 and 34, respectively, of the hub 24 when the bearing sleeves 30 are pressed into position.

High density synthetic resin bearing washers 36 are provided above and below the upper and lower bearing sleeves 30 and contact the bearing sleeves when the idler arm 22 is journaled upon the spindle 14 in the manner to be described. Each of the resin bearing washers 36 may be said to be cup-shaped in configuration, each being characterized by a peripheral axially-extending flange 38 which extends a short distance in an axial direction on each side of the main bearing portion 37 of the bearing washers 36. In other words, the bearing washers 36 are each characterized by cylindrical recesses or depressions formed in their upper and lower surfaces. The recess at one surface of each of the washers 36 is of a size to receive the flange 30b of the bearing sleeves 30 therein. The fit of the flange 30b in the washer 36 is such that there is a minimum clearance between the flange 30b of the bearing sleeve 30 and the flange 38 of the resin washer 36.

Each of the resin washers 36 has a centrally located, circular aperture 39 therein, the diameter of which is sufficiently large to permit the internal metal sleeve 29 of composite sleeve 26 to pass therethrough, but which is small enough to prevent the passage of the external resin sleeve 28 of the composite sleeve. Also, the thickness of the main bearing portions 37 of the resin washers 36 is substantially equal to one-half the distance by which the length of the internal metal sleeve 29 of the composite sleeve 26 exceeds the length of the external resin sleeve 28.

The second recess or depression which is formed in each of the resin bearing washers 36 at the opposite surface thereof from the recess receiving the bearing sleeves 30 is of a size to receive a metallic washer 40. The diameter of the metallic washer 40 is approximately equal to the diameter of the cylindrical recess into which it fits so that the metal washer 40 must be pressed into the resin bearing washer 36. The metallic washer 40 defines a centrally located, circular aperture 42 which is of sufficient size to permit passage therethrough of the spindle 14 but is small enough to prevent the metallic portion 29 of the composite sleeve 26 from passing therethrough. The metallic washer 40 is of sufficient thickness to project slightly above the flange 38 of the washer 36 when it is inserted in its respective recess and has a diameter slightly larger than the diameter of the circumferential flange 16. Thus, when the idler arm bearing is assembled, the circumferential flange 16 on the spindle 14 bears only against the metallic washer 40 and not against the flange 38 of the resin washer 36.

As previously indicated, bearing sleeves 30 and bearing washers 36, as well as the outer sleeve 28 of the composite sleeve 26, are composed of high density synthetic resin materials. Some of the materials which have proven satisfactory include: polymerized olefins, such as a polyethylene sold under the trade name Marlex; polymerized tetrafluoroethylene, such as is sold under the trade name Teflon, and long chain synthetic polymeric amides, such as are sold under the trade name Nylon. In practice, it has been found that particularly good and economical results are obtained when the bearing sleeves 30 are made of polymerized ethylene, with the bearing washers 36 and the external sleeve 28 of composite sleeve 26 made of a long chain polymeric amide.

In assembling the idler arm bearing of the present invention, the various bearing elements are slipped over the end 18 of the spindle 14 in the order shown in FIG. 3. The shank portion 30a of each of the bearing sleeves 30 is then pressed into the bore 25 of the hub 24. With the shank portions 30a of the bearing sleeves 30 pressed into the bore 25 of the hub 24, the bearing sleeves 30 will remain in a fixed position relative to the idler arm 22 during operation of the device. A primary bearing surface then exists between the internal walls of the bearing sleeves 30 and the external resin sleeve 28 of the composite sleeve 26. A secondary bearing surface also exists between the internal metal sleeve 29 of the composite sleeve 26 and the periphery of the spindle 14. Because of the reduced frictional resistance to pivotal movement which is offered by the contacting resin surfaces, the greater relative movement will occur between the external sleeve 28 and the bearing sleeves 30 while the internal metal sleeve 29 will tend to remain fixed relative to the spindle 14.

As the nut 20 is tightened on the threaded end portion 18 of the spindle 14, the peripheral flanges 30b of bearing sleeves 30 will be pressed against the upper and lower surfaces of the hub 24, thus further assuring the fixation of the bearing sleeves 30 relative to the hub portion 24. Due to the dimensions of each of the metal washers 40 and the bearing washers 36, an additional bearing surface exists between the portion 37 of each of the bearing washers 36 and the external resin sleeve 28 of composite sleeve 26. A secondary bearing surface also exists between the metal portion 29 of the composite sleeve 26 and the metallic washer 40. However, the pressure normally exerted by the metallic washers 40 on the internal metal sleeve 29 will be sufficient to maintain the composite sleeve 26 fixed in relation to the washers 40.

The peripheral axially-extending flange 38 of the bearing washer 36 extends downwardly over a portion of the periphery of the flange 30b of resin bearing sleeve 30 and thereby affords a protective skirt preventing the ingress of deleterious substances to the bearing surfaces of the idler arm assembly. The flange 38 also materially assists in preventing the development of looseness or play between the mating or cooperating parts of the bearing over an extended period of use. Thus, even though the axial bores of certain of the sleeve and washer components should become slightly enlarged due to prolonged wear, centering of such components about the composite sleeve 26 and spindle 14 will still be effected by the axially aligning characteristics of the flange 38.

It has been learned that the surfaces of certain synthetic resins have a lubricative characteristic and that this characteristic is particularly effective where there is contact of dissimilar resins. The bearing assembly construction of the present invention takes full advantage of this property. The lubricative characteristics of the resin materials employed makes supplemental lubrication by grease or oil unnecessary. Moreover, it may also be noted that the materials of construction of the bearing sleeves 30 and the bearing washers 36 make these members slightly plastic in their cold condition and minimize the possibility of overloading the bearing surfaces when the nut 20 is tightened.

This invention has been described as it particularly applies to bearings encountered in idler arm mechanisms of automobiles. It can be seen that the principles of this invention are readily adaptable to any mechanism involving a relatively oscillating member, whether encountered in vehicles or otherwise. Although this invention has been described with a certain degree of particularity, it is manifest that many changes may be made in the details of construction and arrangement of the components without departing from the spirit or scope of this disclosure. For example, the shank portions of the bearing sleeves may be splined to the hub of the idler arm to provide further assurance against relative rotation. Accordingly, this invention should be considered as limited only by the scope of the appended claims.

We claim:

1. An idler arm assembly, comprising a bracket having a spindle; a metallic tubular sleeve slidingly receiving said spindle; a high density synthetic resin sleeve press fitted on said metallic tubular sleeve; high density synthetic resin bearing sleeve means slidingly fitting around said high density synthetic resin sleeve; an idler arm having a bore therethrough tightly receiving said bearing sleeve means whereby said sleeve means will move with said idler arm when the idler arm is pivoted; and means retaining the idler arm in fixed longitudinal relation to said spindle, said last-mentioned means including high density synthetic resin bearing washers abutting the opposite ends of said bearing sleeve means.

2. An idler arm assembly, comprising a bracket having a downwardly extending spindle portion, and a circumferential flange at the upper end of said spindle portion; a composite tubular sleeve around said spindle portion; said composite tubular sleeve having an inner metallic layer and a high density synthetic resin outer layer of shorter length than said metallic inner layer; an idler arm having a hub portion provided with a bore therethrough, said bore being larger in diameter than the outside diameter of said composite tubular sleeve; and bearing means journaling the idler arm hub on said composite sleeve for pivotal movement of the idler arm with respect to said composite sleeve, said bearing means comprising upper and lower high density synthetic resin bearing sleeves in said bore around said composite sleeve, each of said bearing sleeves being of a size to provide a sliding fit thereof on said composite sleeve and a tighter fit thereof in said bore to promote movement of said bearing sleeves with said hub upon pivotation of said idler arm, said bearing sleeves being arranged in said bore to protrude both above and below said hub; a pair of high density synthetic resin washers on said spindle above and below the upper and lower bearing sleeves respectively, and each having a central aperture therethrough of a size to receive the metallic portion of said composite tubular sleeve, said washers each having a recess in one surface of a size to snugly receive the protruding portions of the respective bearing sleeves; and means on the lower end of said spindle providing an upward force acting against the lower resin washer to retain said washers in contact with said sleeves and maintain the idler arm in a fixed longitudinal position on the spindle.

3. An idler arm assembly as claimed in claim 2 wherein said resin washers each have a second recess in their surfaces opposite the surface having said first-mentioned recess; and characterized further to include a metallic washer pressed into each of said second recesses, said metallic washers each having a central aperture permitting said spindle to pass therethrough while preventing any portion of said composite tubular sleeve from passing therethrough.

4. An assembly as defined in claim 2 wherein each of said bearing sleeves has a circumferential flange on the protruding portion thereof larger in diameter than said bore to contact the respective ends of the idler arm hub, each of said circumferential flanges being of a size to snugly fit within the recess in said one surface of its respective resin washer without binding.

5. An assembly according to claim 2 wherein said outer layer of said composite sleeve and said resin washers are each composed of a synthetic resin material which is dissimilar to that of which said bearing sleeves are composed.

6. An assembly according to claim 2 wherein said resin washers, said bearing sleeves, and the outer layer of said composite sleeve are composed of a material selected from the group consisting of polymerized ethylene, polymerized tetrafluoroethylene and polymerized amide.

7. An assembly according to claim 2 wherein said resin washers and the outer layer of said composite sleeve are composed of a polymerized amide material and said bearing sleeves are composed of a polymerized ethylene material.

References Cited in the file of this patent
UNITED STATES PATENTS

| | | |
|---|---|---|
| 2,592,280 | Herbenar | Apr. 8, 1952 |
| 2,642,318 | Ricks | June 16, 1953 |
| 2,828,668 | De Angelis | Apr. 1, 1958 |